United States Patent [19]

Thaniyavarn

[11] Patent Number: 4,669,815

[45] Date of Patent: Jun. 2, 1987

[54] INTEGRATED OPTICAL WAVEGUIDE MULTIPLEXER/DEMULTIPLEXER

[75] Inventor: Suwat Thaniyavarn, Pasadena, Calif.

[73] Assignee: TRW Inc., Redondo Beach, Calif.

[21] Appl. No.: 764,692

[22] Filed: Aug. 12, 1985

[51] Int. Cl.[4] .............................................. G02B 6/26
[52] U.S. Cl. ............................... 350/96.15; 350/96.11; 350/96.13
[58] Field of Search ...................... 333/21 R, 109, 113; 350/96.11, 96.12, 96.13, 96.14, 96.15

[56] References Cited

U.S. PATENT DOCUMENTS 4,127,320 11/1978 Li ...................................... 350/96.15

OTHER PUBLICATIONS

Appl. Phys. Letter 37(1) Jul. 1, 1980, "An Optical TE-TM Made Splitter", American Institute of Physics, pp. 20-22.

Japanese Journal of Applied Physics, vol. 19 (1980) "A Coupled-Waveguide TE/TM Mode Splitter", pp. 455-458.

*Primary Examiner*—Eugene R. LaRoche
*Assistant Examiner*—James C. Lee
*Attorney, Agent, or Firm*—Robert J. Stern; Noel F. Heal

[57] ABSTRACT

An optical waveguide device for multiplexing and demultiplexing transverse magnetic (TM) and transverse electric (TE) polarization modes. The device has two waveguides, having first and second coupler segments in close proximity to each other, but with the second coupler segment capable of supporting only one polarization mode. When both TE and TM modes are introduced into the first coupler segment, one mode is coupled completely across to the second coupler segment, but the mode not supported in that segment remains in the first segment and is transmitted to an output port. In the illustrative embodiment of the invention, this selective coupling of the polarization modes is achieved by choosing a narrow width for the second coupling segment, such that the TE polarization mode is not supported but the TM polarization mode is. The interaction length of the coupling segments is selected to produce complete coupling of the TM energy to the second coupling segment.

3 Claims, 1 Drawing Figure

INTEGRATED OPTICAL WAVEGUIDE MULTIPLEXER/DEMULTIPLEXER

BACKGROUND OF THE INVENTION

This invention relates generally to optical waveguide devices and, more particularly, to devices for multiplexing two orthogonally polarized optical signals, or for demultiplexing a composite signal into two orthogonally polarized signals. Electrooptical devices are preferably operated using optical signals that are linearly polarized in one direction, such as in the transverse magnetic (TM) mode. In optical communications systems, there is frequently a need to combine two orthogonally polarized optical signals in a single waveguide, or to separate the two polarization modes, the TM mode and the transverse electric (TE) mode into two waveguides. Devices for performing these functions are called TE/TM multiplexer/demultiplexers, or TE/TM splitter/combiners.

There are many publications relating to this general topic. The following are represenative papers describing prior TE/TM multiplexer/demultiplexers:

R. C. Alferness et al., "Low-cross-talk waveguide polarization multiplexer/demultiplexer," Optics Lett. Vol. 10, No. 4, April 1984, pp. 140-142.

Osamu Mikami, "LiNbO$_3$ coupled-waveguided TE/TM mode splitter," Appl. Phys. Lett. 36(7), Apr. 1, 1980, pp. 491-493.

Hirochika Nakajima et al., "Crosstalk Characteristics of Ti-LiNbO$_3$ Intersecting Waveguides and Their Application as TE/TM Mode Splitters," IEEE J. of Quant. Elec., Vol QE-18, No. 4, April 1982, pp. 771-75.

D. Yap et al., "Passive Ti-LiNbO$_3$ channel waveguide TE-TM mode splitter," Appl. Phys. Lett. 44(6), Mar. 15, 1984, pp. 583-585.

All of the polarization multiplexers or power combiners of the prior art either employ electrooptical devices or intersecting waveguides. When intersecting waveguides are used, there is considerable cross-talk between the two polarization modes, and precise control must be exercised over the fabrication conditions. If electrooptical effects are employed, it is also difficult to obtain low cross-talk components simultaneously for both polarization modes. Another approach is to employ a metallic overlay to force a mismatch between the modes of the waveguide. However, this requires a more complex fabrication technique.

Accordingly, there is still a need for improvement in the field of TE/TM multiplexer/demultiplexers and the present invention satisfies this need.

SUMMARY OF THE INVENTION

The present invention resides in a single-mode integrated optical waveguide TE/TM multiplexer/demultiplexer in which only passive waveguide elements are employed to effect multiplexing or demultiplexing of orthogonally polarized signals. Briefly, and in general terms, the invention comprises a substrate, and first and second waveguide strips formed in the substrate. The first waveguide strip has a first port for propagation of mixed transverse electric (TE) and transverse magnetic (TM) polarization modes and a second port for propagation of only one of the modes, and the second waveguide strip has a port for the propagation of the other mode only. The first and second waveguide strips have corresponding coupler segments that are parallel and in close proximity to each other, the coupler segment of the first waveguide strip being wide enough to support propagation in both modes and the coupler segment of the second waveguide being of such a width as to support propagation in only one mode. In the illustrative embodiment, the coupler segment of the second waveguide strip is made too narrow to support the TE mode, but wide enough to support the TM mode.

In operation as a demultiplexer, a mixed-polarization-mode signal is input to the first port of the first waveguide strip. At the coupler segment there is selective coupling of this energy to the coupler segment of the second waveguide strip. Since the TE mode is not supported in the second waveguide, no TM-mode energy is coupled into the second waveguide strip, and the TE mode is propagated to the second port of the first waveguide strip. The TM energy in the first waveguide strip is coupled back and forth between the coupler segments of the first and second waveguide strips, in accordance with well known principles of optical couplers. For a selected interaction length of the coupler segments, the TM energy can be made to transfer completely to the second waveguide strip, from which it will be propagated through the port associated with that waveguide.

In operation as a multiplexer, the structure receives TE energy at the second port of the first waveguide strip, and TM energy at the port of the second waveguide strip. The action that occurs in the coupler segments is basically the inverse of that which takes place in the demultiplexing mode of operation.

The principal advantages of the novel structure are that no complex fabrication is required, and that cross-talk between the modes is kept to a minimum. A further advantage is that one of the modes is automatically confined to one output port without the need for any special adjustments. The other mode is independently adjustable by controlling the coupling or interaction length of the coupling segments, or by employing an electrooptical effect.

It will be appreciated from the foregoing that the present invention represents a significant improvement in the field of TE/TM multiplexer/demultiplexers. Other aspects and advantages of the invention will become apparent from the following more detailed description, taken in conjunction with the accompanying drawings.

DESCRIPTION OF THE PREFERRED EMBODIMENT

Figure 1:
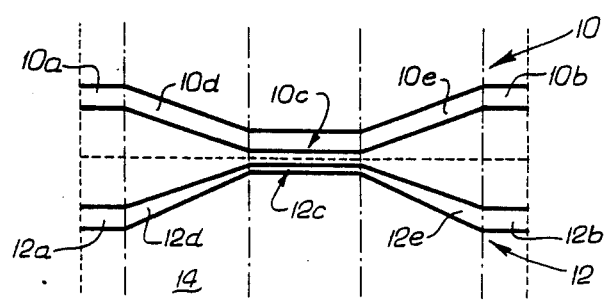
FIG. 1 is a plan view of an optical integrated waveguide TE/TM polarization multiplexer/demultiplexer constructed in accordance with the invention.

As shown in the drawings for purposes of illustration, the present invention is concerned with optical waveguide TE/TM polarization multiplexer/demultiplexers, or power combiner/splitters. There is a need in optical communications for such devices to separate or combine optical signals having components with orthogonal polarization modes. One application of these devices is for multiplexing two communication signals in a single-mode fiber. Prior solutions to this problem have posed difficulties in the form of significant cross-talk between polarization modes, or have been relatively complex to fabricate.

In accordance with the invention, a single-mode integrated optical waveguide TE/TM polarization multiplexer/demultiplexer is fabricated in the form of two waveguide strips, indicated by reference numerals 10 and 12, on a single substrate 14. The first waveguide strip 10 has a first port 10a, a second port 10b, and a central coupler segment 10c. Similarly, the second waveguide strip 12 has first and second ports 12a and 12b and a central coupler segment 12c. The two coupler segments 10c and 12c are parallel and in close proximity to each other, but the first ports 10a and 12a are relatively widely spaced, as are the second ports 10b and 12b. Transition segments 10d and 12d join the first ports 10a and 12a to the coupler segments 10c and 12c, respectively, and two other transition segments 10e and 12e join the coupler segments 10c and 12c to the second ports 10b and 12b, respectively. As will be described, the first port 12a and the transition segment 12d of the second waveguide strip 12 play no part in the operation of the device, but were included only for reasons of symmetry.

In operation as a demultiplexer, the device receives an input signal having both TE and TM polarization modes through the first port 10a of the first waveguide strip 10. In the coupler segments 10c and 12c, there is coupling of energy back and forth between the two waveguides, but the design of the segments results in none of the TE-mode energy being coupled to the second waveguide strip 12. The second coupler segment 12c is selected to be too narrow to support propagation of the TE polarization mode, and none of the TE-mode energy is coupled across the gap between the two coupler segments. On the other hand, the TM mode of polarization is easily supported in both segments of the coupler, and the TM-mode energy is coupled back and forth between the two segments 10c and 12c. The length of these segments is selected to result in total coupling of the energy to the second coupler segment 12c. This length is determined experimentally, consistent with normal optical coupler design practice. Since all of the TM-mode energy but none of the TE-mode energy is coupled into the second waveguide strip 12, the result is that only the TE-mode energy emerges from the second port 10b of the first waveguide strip 10, and only the TM-mode energy emerges from the second port 12b of the second waveguide strip 12.

Operation as a multiplexer is basically the inverse of that described for the demultiplexer. The TE mode and the TM mode of polarization are input to the second ports 10b and 12b, respectively, and the combined modes emerge from the first port 10a of the first waveguide strip.

Typical dimensions for the width of the waveguide strip are 7 microns to support both polarization modes of an optical signal at 1.3 microns wavelength, and 4-5 microns to support only the TM polarization mode. Typical materials are lithium niobate ($LiNbO_3$) for the substrate 14 and diffused titanium (Ti) for the waveguide strips 10 and 12.

It will be appreciated from the foregoing that the present invention represents a significant advance in optical waveguide polarization multiplexer/demultiplexers. In particular, the invention provides the desired multiplexing or demultiplexing function with relatively low cross-talk between polarization modes, and with an insertion loss comparable to that obtained with prior techniques. Perhaps even more importantly, the structure of the invention can be made conveniently without costly and complex fabrication steps. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A single-mode integrated waveguide polarization multiplexer/demultiplexer, comprising:
   a substrate;
   a first waveguide strip formed in the substrate, having a first port for propagation of mixed transverse electric (TE) and transverse magnetic (TM) polarization modes, and a second port for propagation of only one polarization mode; and
   a second waveguide strip formed in the substrate, having a port for the propagation of only the other polarization mode;
   the first and second waveguide strips having corresponding coupler segments that are parallel and in close proximity to each other, the coupler segment of the first waveguide being wide enough to support propagation in both modes and the coupler segment of the second waveguide being of such a width as to support propagation in practically only one polarization mode but not in the other.

2. A single-mode integrated waveguide polarization multiplexer/demultiplexer as defined in claim 1, in which:
   the second waveguide coupler segment is significantly narrower than the first and supports only the TM polarization mode, whereby the TM mode is coupled practically totally to the second waveguide strip and the TE mode is practically the only mode output from the second port of the first waveguide strip.

3. A single-mode integrated waveguide polarization multiplexer/demultiplexer as defined in claim 1, in which:
   the substrate is of C-cut lithium niobate;
   the waveguide strips are of titanium diffused into the substrate;
   the width of the first waveguide strip is approximately seven microns; and
   the width of the second coupler segment is approximately four to five microns.

* * * * *